Patented Aug. 7, 1923.

1,464,143

UNITED STATES PATENT OFFICE.

JEREMIAH B. G. TABER, OF NEW HAVEN, CONNECTICUT.

PREPARATION FOR TREATING ARTICLES OF RUBBER.

No Drawing. Application filed November 7, 1921. Serial No. 513,330.

*To all whom it may concern:*

Be it known that I, JEREMIAH B. G. TABER, a citizen of the United States, residing at New Haven, in the county of New Haven and State of Connecticut, have invented a new and useful Improvement in Preparation for Treating Articles of Rubber; and I do hereby declare the following to be a full, clear, and exact description of the same.

This invention relates to improvement in preparation for treating articles of rubber, such, for instance, as rubber boots and shoes, inner tubes and shoes for vehicle wheels, rubber hose, etc. It is well known that articles containing rubber gum deteriorate by exposure to the atmosphere and tend to harden, so as to lose all pliability, and hence are liable to break. The object of this invention is to provide a preparation which may be applied to articles containing rubber and by which the softness or pliability of the rubber is renewed, and the invention consists in the combination of materials hereinafter set forth and particularly recited in the claim.

The preparation is produced in the following proportions: three grains of lamp black are dissolved in one ounce of petroleum jelly and eighty grains of cod liver oil, and the compound thoroughly mixed. I then warm fifteen ounces of petroleum jelly to 130° F. This is best done by placing the container in a dish of water of the necessary temperature. To this melted petroleum jelly I add the lamp black and cod liver oil, and thoroughly mix. The compound is then cooled to 70° F., and to it I add five grains of rubber gum dissolved in four drams of benzene, the parts being thoroughly mixed.

This preparation is spread upon articles of rubber which have become more or less hardened by exposure to the atmosphere and allowed to stand. Preferably, the articles to be treated will be warmed to about 100°, more or less, according to the weight of the articles. After the coated articles have stood for some hours, any surplus material not absorbed by the article may be wiped off. Certain variations in the proportions above stated may be made without departing from my invention. The use of this composition softens rubber articles which have become hard, and makes them more pliable, so that additional service may be obtained therefrom. It also helps to prevent cracking or breaking of rubber goods in service, especially where the rubber has to undergo considerable "working."

I claim:

A preparation for treating rubber articles, which comprises petroleum jelly, lamp black, cod liver oil, rubber gum and benzene in the proportions substantially as specified.

In testimony whereof, I have signed this specification in the presence of two subscribing witnesses.

JEREMIAH B. G. TABER.

Witnesses:
 FREDERIC C. EARLE,
 MALCOLM P. NICHOLS.